United States Patent [19]

Rüther

[11] 4,353,661

[45] Oct. 12, 1982

[54] EXHIBITION/HOUSE FURNITURE AS WELL AS PLAY AND SPORT EQUIPMENT

[76] Inventor: Hubert Rüther, Elbring 25, Seevetal 8 bei Hamburg, Fed. Rep. of Germany, D-2105

[21] Appl. No.: 53,601

[22] Filed: Jun. 29, 1979

[30] Foreign Application Priority Data

Jul. 6, 1978 [DE] Fed. Rep. of Germany ... 7820267[U]

[51] Int. Cl.³ .......................... F16D 1/00; F16B 7/00; A44B 17/00

[52] U.S. Cl. .................................... 403/171; 403/174; 403/178; 403/205; 403/292; 403/295; 24/221 R; 411/340

[58] Field of Search ............... 403/403, 205, 174, 178, 403/170, 173, 295, 292, 171; 85/5 P; 411/340; 24/221 R

[56] References Cited

U.S. PATENT DOCUMENTS

| | | | |
|---|---|---|---|
| 481,566 | 8/1892 | Hunter | 24/221 R |
| 1,821,182 | 9/1931 | Hoppes | 403/205 X |
| 1,857,530 | 5/1932 | Dandridge et al. | 24/221 R |
| 2,238,561 | 4/1941 | Goodyear | 403/174 X |
| 2,260,048 | 10/1941 | Newell | 24/221 R |
| 3,858,989 | 1/1975 | Field | 403/295 X |
| 4,049,355 | 9/1977 | Kawazu | 403/295 X |
| 4,194,429 | 3/1980 | Wright | 85/5 P |

FOREIGN PATENT DOCUMENTS

| | | | |
|---|---|---|---|
| 84575 | 3/1958 | Denmark | 403/292 |
| 826354 | 1/1938 | France | 403/171 |
| 1400599 | 4/1965 | France | 403/174 |
| 27703 | of 1896 | United Kingdom | 403/178 |
| 1142142 | 2/1969 | United Kingdom | 85/5 P |
| 1295049 | 11/1972 | United Kingdom | 85/5 P |

*Primary Examiner*—James Kee Chi
*Attorney, Agent, or Firm*—Martin A. Farber

[57] ABSTRACT

The furniture or equipment comprises building elements which can be combined in any desired manner as its parts, namely plug connectors, connecting pipes, toggles and plates. The positive plug connection between a connector socket of a plug connector and a pipe end of a connecting pipe of circular-cylindrical form so as to form a plug unit is secured in form locked (positive) fashion by a toggle. For inserting plates between parallel connecting pipes clamp connections are provided.

The parts are also of importance by themselves.

16 Claims, 16 Drawing Figures

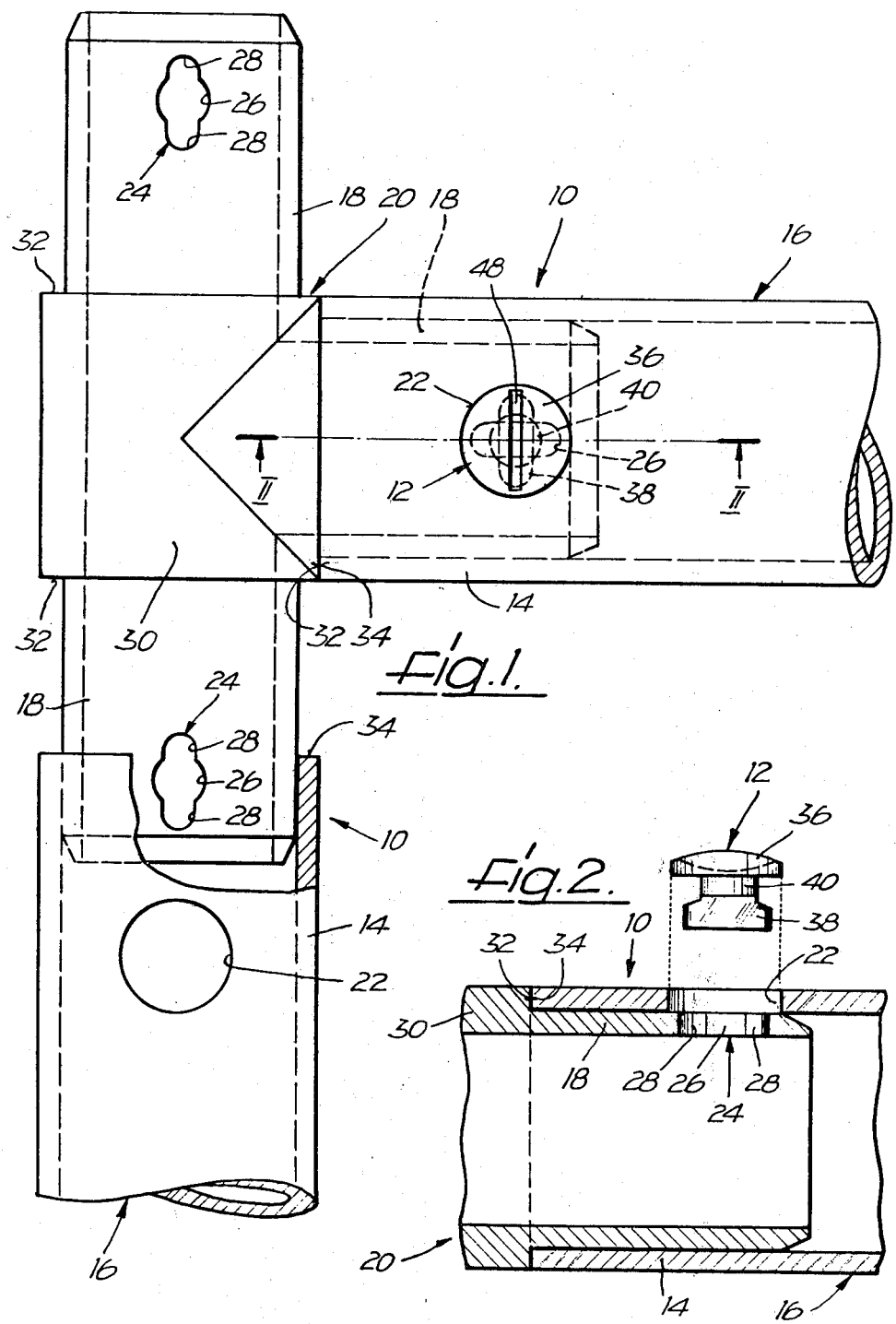

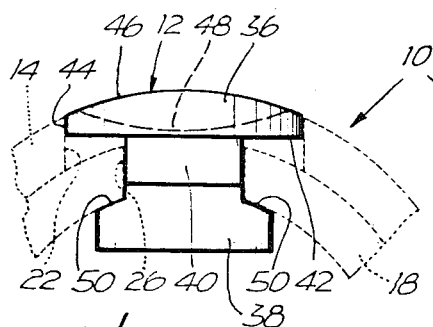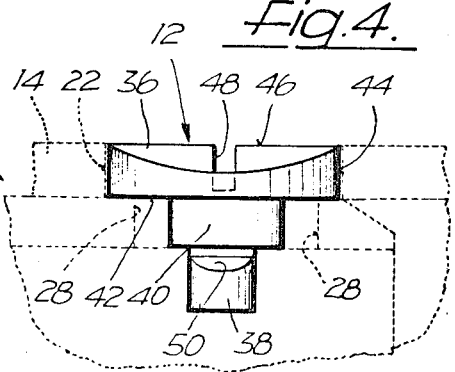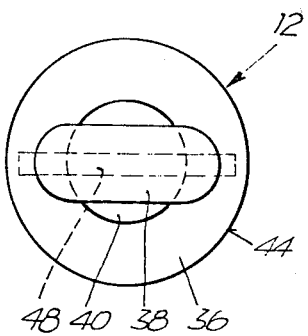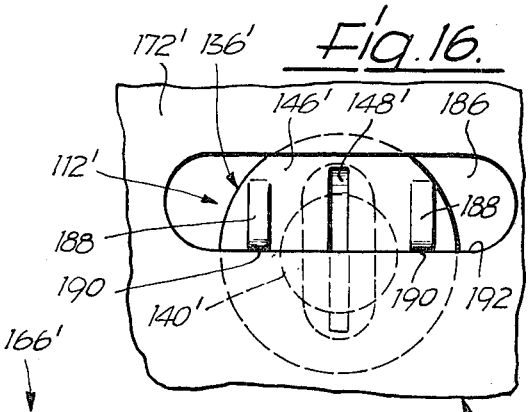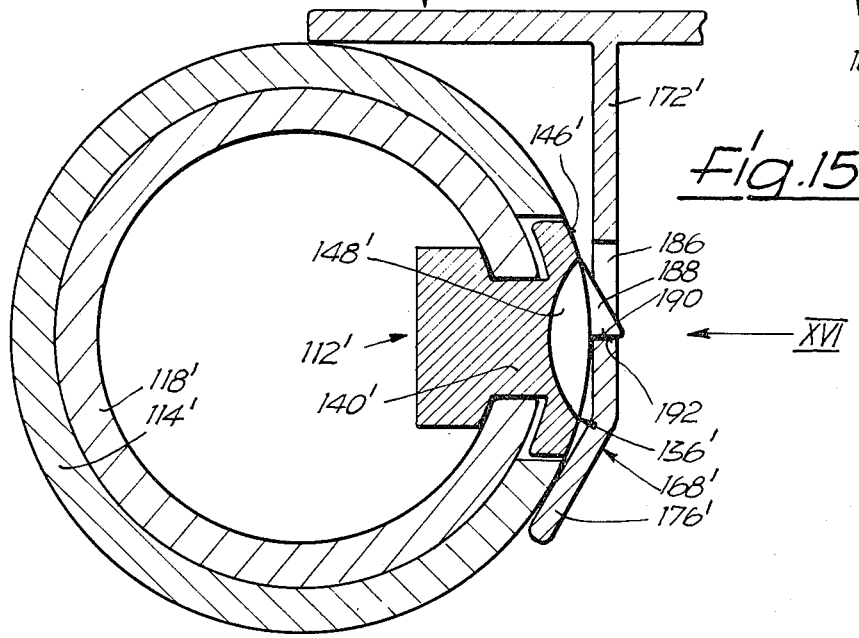

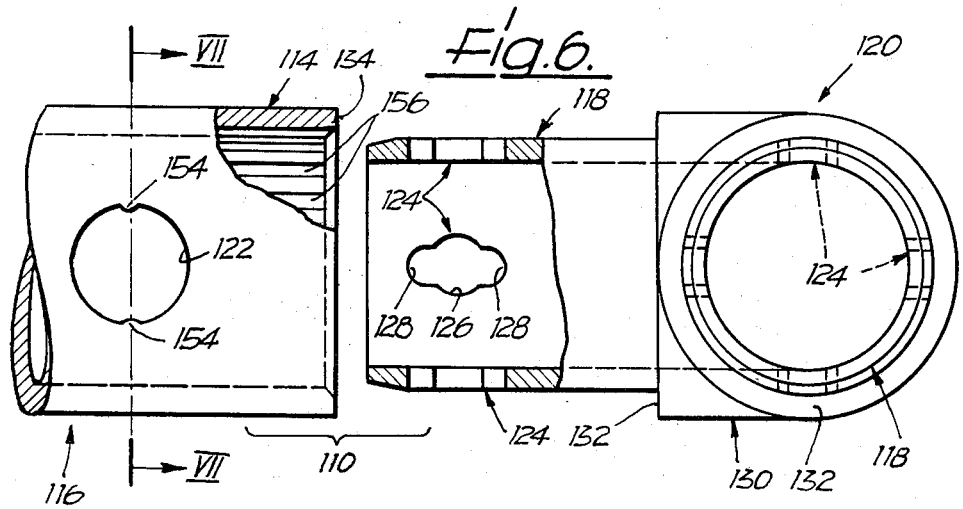
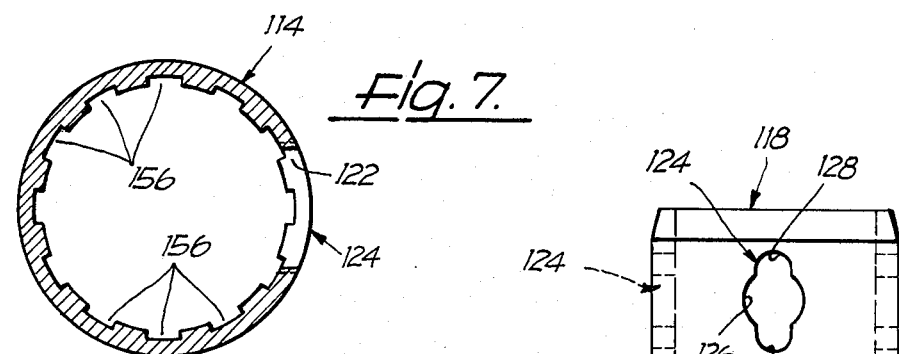
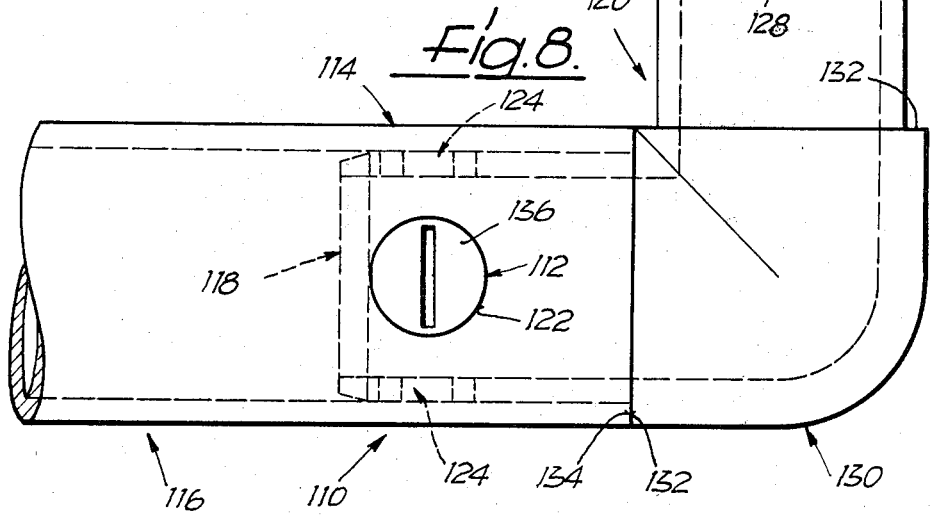

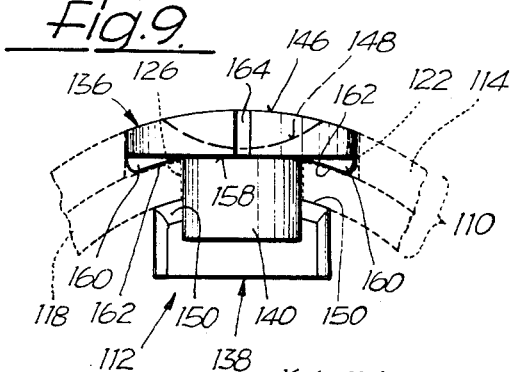
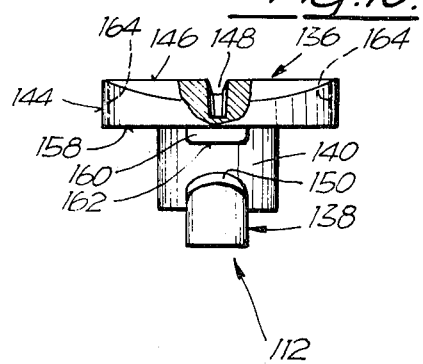
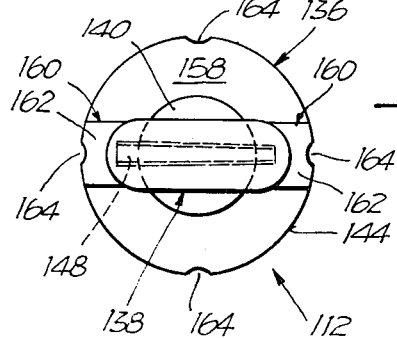
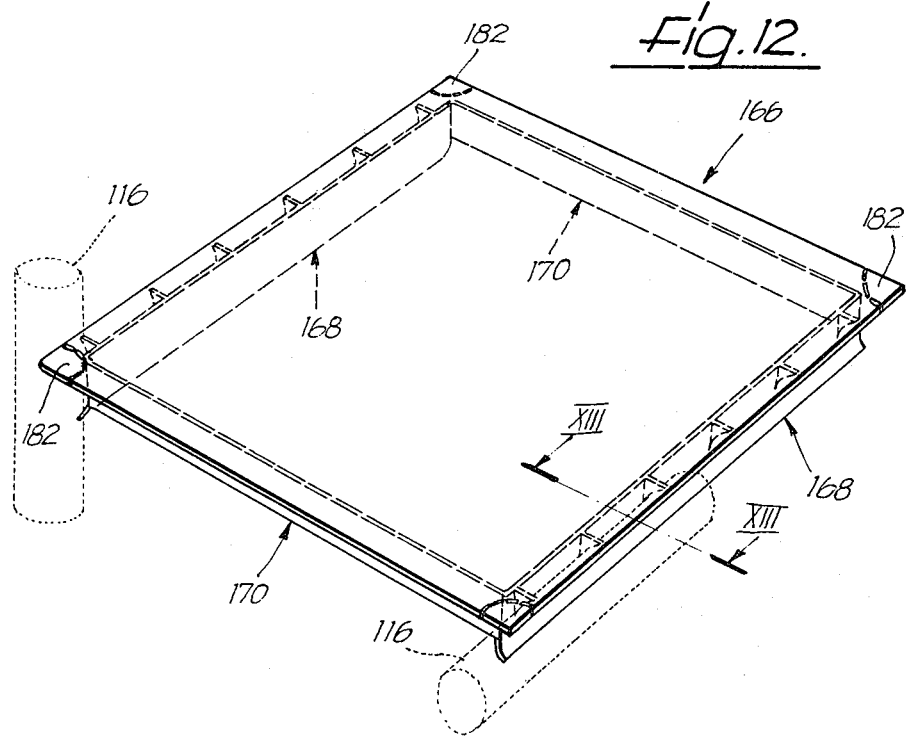

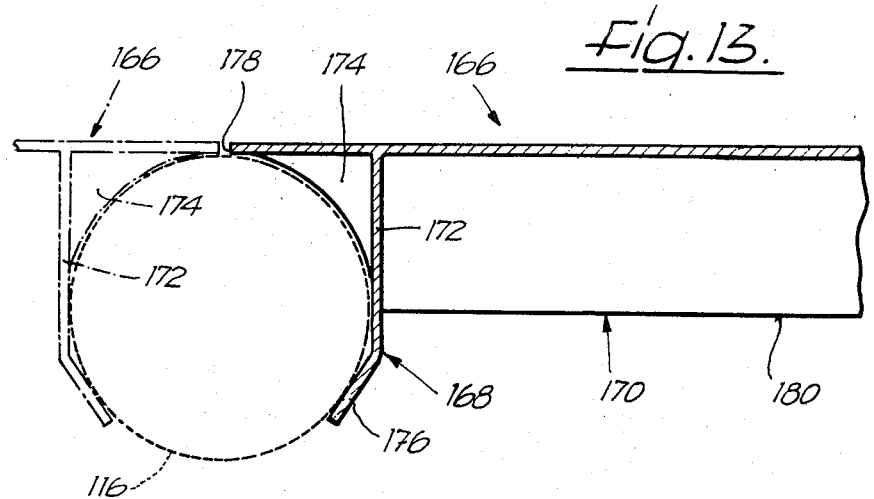
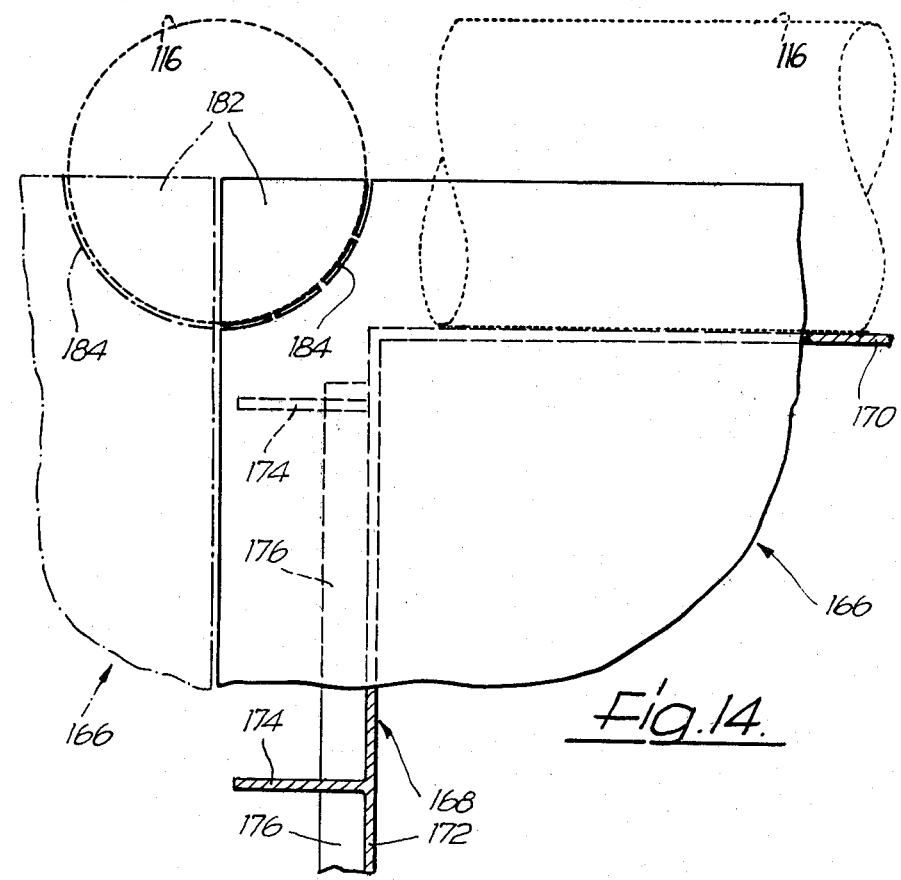

EXHIBITION/HOUSE FURNITURE AS WELL AS PLAY AND SPORT EQUIPMENT

This invention relates to exhibition/house furniture as well as play and sport equipment or parts thereof, having cylindrical connecting pipes and plug connectors each of which has at least two cylindrical connector sockets developed on an extension part, and having plug units each of which is formed by the plug connection of a connector socket and the end of a connecting pipe inserted in it.

A plug connection of one end of a connecting pipe of cylindrical cross section with a socket of a plug connector having at least two cylindrical sockets which are ridgidly connected to each other by an attachment part whereby the pipe end and the connector socket plugged together form a plug unit, is known from German utility model No. 7 344 583 in which the connecting pipe and the plug connector are a tent pole and an angular part respectively for tent frames.

The object of the present invention is to create furniture or equipment of the above-indicated type the structural parts of which represent a system of only a few building elements from which for instance play structures for children can be easily and safely erected as well as modified. This is to be effected by suitable shaping and further development of the connecting pipes and plug connectors and by the formation of the fewest possible new elementary structural parts.

The above object is achieved in accordance with the invention in the manner that each of the two ends of each connecting pipe has at least one wall opening and each connector socket has at least one wall opening, the wall opening formed in the radial inner part of each plug unit being provided with a cross-sectional shape other than circular, and by the fact that toggles which inserted into and turned in the plug units are provided in order to interlock the plug units, these toggles each engaging the positive (form-locked) complementary fitting manner into the two wall openings of a plug unit which have been brought to coincide radially with each other and which in order to prevent their turning engage in force-locked (frictional) manner behind the edge of the wall opening in the radially inner part of the plug unit. In this way the plug connection has become a positive (form-locked) connection in the sense that the plug unit comprising the pipe and tube and connecting socket assembled without toggle and only in force-locked (frictional) fashion, is imparted from each of these parts thereof a form-locked (positive) connection with the toggle which represents the connecting link between pipe end and connector socket.

It is possible to use optionally either the pipe end or the connector socket as inner part of the plug unit. The claims therefore in accordance with their wording, cover both of these alternative solutions of the invention.

In one embodiment of the furniture or equipment in accordance with the invention, the non-circular cross-sectional shape of one of the two cooperating wall openings of the plug unit has a shape similar to a keyhole, formed of a circle and a narrow half-oval and the toggle has a shank having a circular cross-sectional shape adapted to said circular shape as well as a rotary hasp on the radial inner end of the shank, which shank fits through the half-oval. In particular, it is contemplated that the one wall-opening cross section having a combined circular and half-oval shape have a shape formed of a circle and a narrower concentric full oval and that the rotary hasp be adapted to the full oval. In this case, it is immaterial whether the toggle is introduced radially in this manner or turned 180 degrees with respect to the axis of its shank. Furthermore, the toggle can still be used if one of its rotary hasps is broken off.

In the preferred embodiment, the cross section of the wall opening formed in the radially outer part of the plug unit has a circular shape and its diameter approximates the greatest length of the rotary hasp measured in a direction which is radial with respect to the shank of the toggle. Such a wall opening can also be produced easily subsequently by drilling, in which case its inside diameter must of course be so dimensioned that the rotary hasp can pass through it, at least after the toggle has been placed in oblique position.

The toggle of the preferred embodiment has a turning head on the radially outer end of its shank, which head fits in the wall opening in the radially outer part of the plug unit. By means of this turning head which disappears within the radially outer part of the plug unit, the toggle can be conveniently turned by 90 degrees for locking and opening.

In the preferred embodiment, the turning head of the toggle has a screw-head slot of coin width so that any child provided with a coin can conveniently turn the toggle and thus the rotary hasp.

In the preferred embodiment, the top side of the turning head which faces away from the rotary hasp has a circular-cylindrical curvature which is adapted to the outer circular-cylindrical curvature of the radially outer part of the plug unit. In a given position of rotation of the toggle the turning head therefore disappears within the wall—which is the recess for it—of the radially outer part of the plug unit without protruding and thus interfering.

In the preferred embodiment, the top of the rotary hasp which faces the turning head has a circular-cylindrical curvature which is adapted to the inner circular-cylindrical curvature of the radially inner part of the plug unit. In this way there is produced the greatest possible contact surface common to the rotary hasp and the inner part of the plug unit, so that an amount of static friction of the rotary hasp against the inner part of the plug unit which is sufficient in particular even with a force-locked (frictionally locked) plug connection is present to prevent the toggle from unintentionally turning around the axis of its shank.

The preferred embodiment is characterized by the fact that the screw-head slot extends parallel to the main lengthwise direction of the rotary hasp, that the longitudinal axis of the oval of the wall opening is arranged in the radially inner part of the plug unit parallel to the longitudinal axis of said cylindrical part, and that the cylinder axis of the curvature of the top of the turning head extends transverse to the screw-head slot and the rotary hasp. In this way there has been created an arrangement which assures an interlock which is free of play and which, by the orientation of the screw-head slot, clearly shows in what position the rotary hasp is, and which is furthermore compatible with the requirement that the turning head in the lock position is not to be felt or visible from the outside.

In another preferred embodiment, the turning head of the toggle is provided on the bottom side thereof facing the rotary hasp with two knops lying diametrically opposite each other with respect to said shank, the straight line connecting said knops extending parallel to the turning hasp of the toggle, the knops upon the turning back of the toggle resting against the edge of the wall opening in the radially inner part of the plug unit and thereby lifting the toggle radially outward. In this way assurance is had that the turning head of the loosened toggle can also actually be grasped for the removal of the toggle.

In this embodiment, each connector socket has four wall openings, whose radial axes, which form a cross, intersect on the axis of the socket, and each pipe end has only one wall opening. On the one hand, the connecting pipe, due to the four wall openings in the connector socket need never be turned by more than 90 degrees around its longitudinal axis in order that it can be connected with the connector socket in form-locked (positive) manner in the above-indicated sense by means of a toggle. On the other hand, the pipe end has only one single weak place in the material and after the plug connection has been effected only a single slight unevenness, since the turning head of a toggle which secures the plug unit against axial pull and circumferential twisting practically fills up the wall opening in the end of the pipe.

In this case, the pipe end covers the three unused wall openings in the connector socket. This naturally presupposes that the pipe end is the radially outer part and the connector socket the radially inner part of the plug unit. This relative arrangement is advantageous since it avoids a step, such as present in the reverse case upon the transition from the connector socket to the pipe end or a step-shaped tapering of the pipe end up to its smooth connection with the connector socket.

In this embodiment, the connecting pipes are provided on their inner side with axially parallel longitudinal grooves, resulting in a saving of material without impairing the strength of the connecting pipe. Furthermore, the longitudinal grooves act as dirt collectors which free the slide fit of connector socket and tube end—which is detrimentally affected by dirt—of dirt upon a relative rotation of the two parts of the plug unit and thereby make it again movable. In this connection, I am thinking in particular of the penetration of sand. Plates may be provided each of which is connected by clamp connections with at least two parallel connecting pipes. The plates are provided on one side with two opposite clamping rails and with two opposite junction rails, the four rails being perpendicular to the plane of the plate and forming a rectangle. In this way they establish an easily produced and easily disconnectable connection to in each case four connecting pipes extending along their edges, against which pipes the rails elastically rest or apply themselves as stops. For this former purpose, the clamping rails in the variant of the preferred embodiment are flat ledges each having an edge remote from the plate which is bent in the direction towards the edge of the plate and partially surrounds a connecting pipe. The expense for shaping and the consumption of material are particularly slight with this embodiment.

In the variant, both the height of the clamping rails down to their edge and their clear distance from the adjacent parallel edges of the plates are adapted to the outside radius of the connecting pipes to which the bend of their edge is adapted and, on the other hand, the junction rails which are developed as flat ledges have a height down to their edge and a constant clear distance from the adjacent parallel edges of the plate which corresponds to the outside radius of the connecting pipes. This uniform 1:1 dimensioning ratio provides assurance that a plurality of plates arranged alongside of each other in a plane pass into each other practically without seam.

In the variant, the rectangular corners of the plates are provided with quadrant-shaped intended break lines whose radius corresponds to the outside radius of the connecting pipes. Accordingly after the breaking off of the corners the connecting pipes can engage into the corresponding plate openings to that they do not interfere with the seamless joining of several plates one after the other in a plane. The plates can however also be used with unbroken corners at places where the corners do not get in the way.

In the variant, the clamping rails are provided at each of their two ends with an opening and the turning heads of the toggles are each provided with a locking body which engages through an opening in a clamping rail and grips in locking fashion below the edge of this opening. In this way the possibility is created of securing the plates against the elimination of the clamping action as occurs when the plates are too strongly loaded on the sides thereof having the clamping ledges.

In the variant, the screw-head slot of the turning head on the toggle tapers in wedge-shaped manner in its lengthwise and depth directions. Tapering in one of these two directions can be sufficient. In each case it has the result that the turning head of the toggle clamps fast on a turning tool or wrench used for the turning thereof and can be removed with the latter from the plug unit.

Finally, the variant is characterized by the fact that the cross section of the wall opening in the radially outer part of the plug unit and the longitudinal section of the turning head of the toggle differ slightly from circular shape on at least one detent place each, the deviations being complementary. The detent locking of the turning head in the wall opening of the radially outer part, which should be a pipe end, counteracts the latent tendency of the rotary hasp of the toggle to place itself parallel to the pipe and socket axis and thereby to loosen both the force-locked (frictional) connection of the rotary hasp with the radially inner part, i.e. the connector socket, and to endanger the form locked (positive) connection of the toggle with the radially inner part. The detent locking, however is not absolutely necessary since this embodiment the knops are provided on the turning head of the toggle and they assure self-locking of the toggle and make it necessary for the toggle to be turned intentionally in order to effect a radial lift while overcoming this self-locking action.

The invention will be described in detail below with reference to the preferred embodiment of the furniture or equipment of the invention and its variant which are shown by way of example in the drawing, in which:

FIG. 1 is a top view of a plug connector and of two plug units of one embodiment in which the ends of two connecting pipes are each placed, partially or entirely on sockets of the plug connector;

FIG. 2 is a longitudinal section along the line II—II of FIG. 1 through one of the two plug units with radially removed toggle;

FIGS. 3–5 show two different side views of the toggle of the embodiment (the parts to be connected have been indicated) and a bottom view of the toggle respectively;

FIG. 6 is a side view of a plug connector and of a plug unit of another embodiment of the present invention, shown in an exploded view;

FIG. 7 is a cross section along the line VII—VII of FIG. 6 through one tube end of this plug unit;

FIG. 8 is a top view of the plug connector and the plug unit of this embodiment with toggle;

FIGS. 9 to 11 are two different side views of the toggle of this embodiment (the parts to be connected have been indicated) and a bottom view of this toggle respectively;

FIG. 12 is a perspective view of a plate of this embodiment (supporting connecting tubes have been indicated);

FIG. 13 is a cross section along the Line XIII—XIII of FIG. 12 through this plate;

FIG. 14 is a top view of the corner of the plate shown to the left in FIG. 12;

FIG. 15 is an enlarged cross section as compared to FIG. 13 through a plug unit and a plate part of this embodiment which are connected by a modified toggle of this embodiment; and FIG. 16 is a view of a detail of the showing of FIG. 15 seen in the direction of the arrow XVI in FIG. 15.

The parts of the embodiment shown in FIGS. 1 to 5 have two plug units 10 and one toggle 12 each, each plug unit 10 in its turn consisting of a pipe end 14 of a connecting pipe 16 and a connector socket 18 of a plug connector 20, which have entered into a plug connection with each other.

The pipe end 14 of the plug unit 10 is of circular cylindrical, formation in the same manner as the entire connecting pipe 16 and has a circular wall opening in the form of a radial borehole 22. The connector socket 18 of the plug unit 10 is also of circular cylindrical shape and it also has a radial wall opening, but in the form of a double-bit keyhole 24, the special shape of which has been produced by the superimposing of a borehole 26 on a concentric oval cut-out 28 whose longitudinal axis extends parallel to the longitudinal axis of the connector socket 18 and whose width is substantially less than the diameter of the borehole 26, which is only approximately as large as the radius of the borehole 22 in the pipe end 14, whose diameter is only slightly greater than the length of the cut-out 28.

The plug connector 20 is a T-member and therefore has two axial connector sockets 18 and one connector socket 18 which is perpendicular to them. The three connector sockets 18 are rigidly connected with each other by an attachment part 30, an annular stop surface 32 of the attachment part 30 running at the root of each socket coming from the attachment part around said socket and, when the pipe end 14 is placed on fully, contacting the annular end surface 34 of the latter.

The outside diameter of the stop surface 32 and of the connecting pipe 16 agree with each other as do the inside diameters of the two. The outside diameter of the connector socket 18 is equal in size to the inside diameter of the connecting pipe 16. The distance between the two planes determined by the end surface 34 and the center point of the bore hole 22 respectively, which planes are passed through perpendicularly by the longitudinal axis of the connecting pipe 16, as measurable at the pipe end 14, agrees precisely with the distance, as measurable at the connector socket 18, between the two planes which are determined by the plane of symmetry and the center point of the hole 24 and the stop surface 32 associated with it respectively and which are passed through perpendicularly by the longitudinal surface of the connector socket 18 having the hole 24.

The toggle 12 is formed of three sections, namely a turning head 36, a rotary hasp 38 and a shank 40 connecting the head and the hasp. The turning head 36 has on its bottom a flat annular stop surface 42 which surrounds the shank 40 and the purpose of which will become clear when explaining the embodiment of the present invention. The cylindrical circumferential surface 44 of the turning head 36 has a diameter which is exactly adapted to the diameter of the bore hole 22 in the pipe end 14. On its top 46 there is present in the turning head 36 a screw-head slot 48 of coin width which extends arcuately in a plane which is traversed perpendicularly by the axis of the curvature on the top side 46.

The shank 40 of the toggle 12 is a solid circular cylinder whose diameter is exactly adapted to the bore hole 26 of the hole 24 in the connector socket 18.

The rotary hasp 38 of the toggle 12 is a double shoe, corresponding to the oval cut-out 28, which double shoe fits through said cut-out and has two shoulders 50 facing the turning head 36, the shoulders being of identical development and each having a circular-cylindrical arch the curvature of which agrees exactly with the curvature on the inside of the connector socket 18. The direction of the main length of the rotary hasp 38 which extends from shoulder 50 to shoulder 50 lies in the plane determined by the screw-head slot 48 of the turning head 36. The curvatures of the shoulders 50 of the rotary hasp 38 are naturally identical and concentric to the more weakly curved curvature on the top 46 of the turning head 36. The distance between the rotary hasp 38 and the lower stop surface 42 of the turning head 36, measured parallel to the axis of the toggle shank 40, which distance increases with increasing descent of the shoulders 50, is such that the turning head 36 contacts the edge of the borehole 26 in the connector socket 18, insofar as the edge is not removed by the cut-out 28, when the shoulders 50 of the rotary hasp 38 lie against the inside of the connector socket 18.

After the joining of the plug connection by axially placing a pipe end 14 on a connector socket 18, they then forming a plug unit, in the manner that the borehole 20 in the pipe end 14 is placed concentric to the double-bit keyhole 24 in the connector socket 18, for which it may be necessary to turn the connecting pipe 16 around its longitudinal axis, the toggle 12, with its rotary hasp 38 in front is introduced radially from the outside to the inside first of all through the borehole 22 and then, in a suitable position of rotation, through the hole 24 partially into the plug unit 10 and then turned at 90 degrees with respect to the radially extending axis of its shank 40, whereby the two shoulders 50 of the rotary hasp 38 are swung beneath the edge of the borehole 26 which edge has remained despite the provision of the cut-out 28, so that the rotary hasp 38 engages behind the connecting socket 18 while the turning head 36 which before the turning of the toggle 12 extends out of the borehole 22 now practically completely fills said borehole 22 and rests snugly against the surface of the pipe end 14. In order to unlock the plug connection, the toggle 12 need only be turned 90 degrees further or back, whereupon it can be removed from the hole 24 in the connector socket 18 and the borehole 26 covering it in the pipe end 14. After the removal of the toggle 12, the connecting pipe 16 can be withdrawn axially from the connector socket 18.

The embodiment of the present invention shown in FIGS. 6 to 14 will be explained below only to the extent that there are differences between the embodiments. The parts identical or corresponding to the parts of the embodiment of FIGS. 1 to 5 which have already been explained have been designated by reference numbers which are higher by 100. The above description applies verbatim or by analogy to them.

In the case of the the embodiment of FIGS. 6–14, the sole borehole 122 in the pipe end 114 of the connecting pipe 116 is provided with two diametrically opposite radially inwardly protruding small noses 154, the straight line connecting which intersects the axis of the pipe at a right angle. On its inside the connecting pipe 116 is provided with axially parallel longitudinal grooves 156 of small depth and larger width.

The plug connector 120 is a 90 degree angle piece with two connector sockets 118, each of which has four wall openings in the form of the double-bit keyhole 124, the radial axis of which, forming a cross, intersect at the axis of the socket. The four holes 124 are therefore uniformly distributed on the circumference of each connector socket 118 in one and the same radial plane.

The turning head 136 of the toggle 112 is provided on its bottom 158 facing the rotary hasp 138 with two knops 160 which are diametrically opposite each other with respect to the shank 140 and the connection line of which extends parallel to the rotary hasp 138. Each of the knops 160 has a countershoulder 162 opposite a shoulder 150 of the rotary hasp 138, the countershoulders being of identical formation and each having a circular-cylindrical arching, the curvature of which agrees precisely with the curvature on the outside of the connector socket 118 and has a center point which lies on a straight line which intersects the axis of the shank 140 at a right angle, while, for a hanging shoulder 150 of the rotary hasp 138, the center of curvature lies on a straight line which obliquely intersects the axis of the shank 140. In its circumferential surface 144 the turning head 136 is provided with four indentations 164 distributed uniformly on its circumference, which receive in pairs the two noses 154 on the borehole 122 of the pipe end 114, said indentations being also of the same slight formation as the noses 154 associated with them and forming with the latter two detent places which slightly retain the toggle 112 in its two main positions of rotation, which differ by 90°, and in particular in the locked position of the rotary hasp 138 visible in FIG. 9. However the two knops 160 also prevent accidental unlocking, their main purpose being to rest, upon the backward turning of the toggle 112, on the edge of the hole 124 in the connector socket 118 and thereby lift the toggle radially outwards.

The screw-head slot 148 in the turning head 136 of the toggle 112 is tapered in wedge shape both in its longitudinal direction and in its depth direction, so that the tool used for the removal of the toggle, for instance a coin, is clamped fast in the slot and thereby turns the toggle.

In this modification, plates 166 of rectangular and preferably square shape are provided, which are connected by clamp connections, with, in each case, two parallel connecting pipes 116. Each plate 166 has a smooth top or front side and a bottom or rear side provided with two parallel clamping rails 168 which are opposite each other, and with two parallel junction rails 170 which are opposite each other. The four rails 168 and 170 are perpendicular to the plane of the plate and form a rectangle or square. Each clamping rail 168 consists of a flat ledge 172 arranged on edge which is supported towards the edge of the plate by a plurality of approximately triangular flat parts 174 and of a rim 176 developed on the ledge 174 and bent off towards the edge of the plate, the arrangement of the clamping rail and its dimensions being such that the plate 166 can be clamped not only between two parallel connecting pipes 116 but also, as shown in FIG. 13, two adjacent plates 166 can be clamped fast to one and the same connecting pipe 116 without interfering with each other or forming a disturbing space between the plates. For this purpose, the perpendicular distance of the ledge 172 from the edge 178 of the plate 166 is adapted to the outside diameter of the connecting pipe 116. The height of the ledge 172, which to be sure passes gradually into the bent-off edge 176 also corresponds to said outside diameter. Each junction rail 170 is a flat strip having a height corresponding to the outside diameter of the connecting pipes 116 and identical spacing from the adjacent edge 178 of the plate 166. Accordingly, the clamping rails 168 extend beyond the junction rails 170 by their edge 176. The junction rails 170, due to their arrangement and height can be placed, with linear contact of their edge 180, tangentially against a connecting pipe 116 which furthermore also has linear contact with the adjacent edge 178 of the plate 166. In order to be able to fit the plates 166 between four parallel connecting pipes 116, whose longitudinal axes are perpendicular to the plane of the plate, the four rectangular corners 182 of the plates 166 are provided with quadrant-shaped intended-break lines 184 whose radius corresponds to the outside radius of the connecting pipes 116. For the arrangement of the connecting pipe 116 shown in dashed line in FIG. 14 in the corner 182 shown of the plate 166, this plate corner must be broken along the intended-break line 184 which defines it.

In a further development of the variant, as is shown in FIGS. 15 and 16 in which the parts identical or corresponding to the parts of the variant are designated with reference numbers bearing prime marks, at the two ends of such clamping rails 168' which are located on plates 166 which are loaded on their bottom or rear side, there is provided on oval opening 186 each, the longitudinal axis of said oval openings extending in the longitudinal direction of the clamping rail 168' and the length thereof corresponding at least to the diameter of the turning head 136' on the toggle 112'. Furthermore, above the top 146' of the turning head 136' of those toggles 112' which are intended for cooperation with clamping rails 168' which are further developed in the manner indicated above, there protrude two flat parallel nose-shaped locking bodies 188 between which the screw-head slot 148' extends in parallel direction. The two locking bodies 188 engage into an opening 186 which is located in the ledge 172' of the clamping rail 168' and by their flanks 190 which are parallel to the axis of the toggle shank 140' they engage in locking manner behind the straight edge of the opening 186 which lies closer to the edge 176' of the clamping rail 168'. In order to facilitate the unclamping of the plates 166', during which the clamping rails 168' are elastically deformed, the flanks 190 of the locking bodies 188 can be inclined somewhat and the edges 192 of the openings 186 beveled in a manner corresponding thereto.

Herein the term "pipe" simply means tube.

I claim:

1. Exhibition/house furniture and play and sport equipment part, comprising
   circular-cylindrical connecting pipes and plug connectors, each of the latter having at least two cylindrical connector sockets formed on an attachment part, said connecting pipes and said sockets are circular-cylindrical and form plug units each comprising a plug connection of one of the connector sockets and the end of one of the connecting pipes forming a radially inner part and a radially outer part placed thereon,
   said radially outer part is formed with at least one outer wall opening,
   said radially inner part is formed with at least one inner wall opening radially alignable with said outer wall opening, said inner opening having a non-circular cross sectional shape,
   a toggle is inserted into the radially aligned said openings and turnable therein and constitutes means for locking each said plug unit, said toggle engaging in complementary manner in said aligned openings and frictionally engaging behind an edge of the inner opening in said radially inner part to prevent unintentional turning,
   said toggle includes a turning head connected at a radially outer end thereof,
   said turning head is disposed in and has a diameter equal to the diameter of said outer opening, said turning head has an inner surface frictionally engaging a peripheral outermost surface of said radially inner part.

2. Furniture and equipment according to claim 1, wherein
   said inner opening has a shape formed as a circular cylinder portion and as a narrower at least one semi-oval portion, and
   said toggle comprises a shank connected to said turning head at a radially outer end of the shank, said shank having a circular cylindrical cross sectional shape complementary to and mounted in said circular cylinder portion of said inner opening and a rotary hasp connected to a radially inner end of said shank adapted to pass through said semi-oval portion.

3. Furniture and equipment according to claim 2, wherein
   said inner opening constitutes a combination of said circular cylinder portion and two of said semi-oval portions, the latter constituting a narrow complete oval concentric to said circular cylinder portion,
   said rotary hasp has a cross section corresponding to said complete oval.

4. Furniture and equipment according to claim 3, wherein
   said outer opening has a circular-cylindrical shape and a diameter at least substantially equal to a largest length of said rotary hasp measured in a direction which is radial to said shank.

5. Furniture and equipment according to claim 1, wherein
   said turning head is formed with a screw-head slot of substantially the width of a coin.

6. Furniture and equipment according to claim 1, wherein
   said rotary hasp is formed with a radially outermost side facing toward said turning head and having at least a portion thereof having a circular-cylindrical curvature equal to an inner circular-cylindrical curvature of said radially inner part and engaging thereagainst adjacent said edge of the inner opening.

7. Furniture and equipment according to claim 5, wherein
   said rotary hasp has a transverse elongated length measured in a direction which is radial to said shank,
   said screw-head slot extends parallel to said elongated length of said rotary hasp,
   said semi-oval defines a longitudinal axis of said inner opening and is disposed parallel to the longitudinal axis of said parts,
   said turning head has a radially outermost top side having a circular-cylindrical curvature defining a cylinder axis extending transversely to said screw-head slot.

8. Furniture and equipment according to claim 6, wherein
   said turning head is formed with a radially inwardly facing radially innermost side thereof constituting said inner surface of said turning head and facing said rotary hasp, said radially innermost side is formed with two knops disposed diametrically opposite each other with respect to said shank and oriented such that an imaginary symmetrical line connecting said knops is parallel to said rotary hasp, said knops engaging said peripheral outermost surface of said radially inner part adjacent said inner opening at the edge thereof, whereby upon rotation of said turning head from a locked position, said toggle moves radially outwardly from a radially inward position.

9. Furniture and equipment according to claim 1 or 8, wherein
   a radially outermost top side of said turning head facing away from said rotary hasp is formed with a circular-cylindrical curvature corresponding to a peripheral outer circular-cylindrical curvature of said radially outer part of the plug unit and constituting a continuous circular-cylindrical continuation of the latter in a locked position of said toggle with said turning head completely peripherally disposed in said outer opening.

10. Furniture and equipment according to claim 1, wherein
    each said connector socket constitutes said radially inner part and is formed with four of said inner openings, the radial axes of the latter form a cross intersecting the axis of said connector socket, and each said connecting pipe constitutes said radially outer part and is formed with only one said outer opening.

11. Furniture and equipment according to claim 1, wherein
    said outer part is formed with an inner periphery formed with axially parallel longitudinal grooves.

12. Furniture and equipment according to claim 6 or 8, wherein
    said knops have a radially innermost side engaging said peripheral outermost surface of said radially inner part formed with a circular-cylindrical curvature equal to that of said peripheral outermost surface of said radially inner part.

13. Furniture and equipment according to claim 1, wherein
    said shank, rotary hasp and said turning head are formed in one-piece.

14. Furniture and equipment according to claim 1, wherein
said turning head and said outer part adjacent said outer opening constitute cooperating members,
one of said cooperating members is formed with indentations and the other is formed with noses engaging in said indentations.

15. Furniture and equipment according to claim 6, wherein
the remainder of the radially outermost side of said rotary hasp other than said portion thereof has a greater radius of curvature than said inner circular-cylindrical curvature of said radially inner part such that said remainder of the radially outermost side of said rotary hasp is spaced from said inner circular-cylindrical curvature of said radially inner part.

16. Furniture and equipment according to claim 1, wherein
said turning head is formed with a radially inwardly facing radially innermost side thereof constituting said inner surface of said turning head and facing said rotary hasp, said radially innermost side is formed with two knops disposed diametrically opposite each other with respect to said shank and oriented such that an imaginary symmetrical line connecting said knops is parallel to said rotary hasp, said knops engaging said peripheral outermost surface of said radially inner part adjacent said inner opening at the edge thereof, whereby upon rotation of said turning head from a locked position, said toggle moves radially outwardly from a radially inward position.

* * * * *